United States Patent [19]

Ishizaka et al.

[11] 4,034,392
[45] July 5, 1977

[54] EXPOSURE INDICATOR DEVICE IN A SINGLE LENS REFLEX CAMERA WITH A TTL EXPOSURE METER CONTAINED THEREIN

[75] Inventors: Sunao Ishizaka; Yasuhito Kawahara, both of Tokyo, Japan

[73] Assignee: Nippon Kogaku K.K., Tokyo, Japan

[22] Filed: June 22, 1976

[21] Appl. No.: 698,682

[30] Foreign Application Priority Data

June 27, 1975 Japan ............... 50-89959[U]

[52] U.S. Cl. .................. 354/289; 354/53; 354/219
[51] Int. Cl.² ........................ G03B 17/00
[58] Field of Search ............ 354/289, 53-56, 354/57, 61, 219, 224, 225

[56] References Cited

UNITED STATES PATENTS

| | | | |
|---|---|---|---|
| 2,297,428 | 9/1942 | Nuchterlein | 354/57 |
| 3,902,183 | 8/1975 | Saito | 354/219 |
| 3,918,076 | 11/1975 | Shono | 354/219 |

Primary Examiner—John Gonzales
Attorney, Agent, or Firm—Fitzpatrick, Cella, Harper & Scinto

[57] ABSTRACT

In an exposure indicator device in a single lens reflex camera with a TTL exposure meter contained therein which comprises shutter means extraneously operable for displacement between a position in which it closes the opening of an eyepiece mask to intercept light passed through the finder eyepiece portion into the interior of the finder and a position in which it is retracted from the first-named position, first indicator means for effecting exposure indication within the view field of the finder, and second indicator means for effecting exposure indication outside the view field of the finder, change-over means is operatively associated with the shutter means to cause only the first indicator means to effect the exposure indication when the shutter means is in the retracted position and to cause only the second indicator means to effect the exposure indication when the shutter means is in the light-intercepting position.

6 Claims, 3 Drawing Figures

EXPOSURE INDICATOR DEVICE IN A SINGLE LENS REFLEX CAMERA WITH A TTL EXPOSURE METER CONTAINED THEREIN

BACKGROUND OF THE INVENTION

1. Field of the Invention

This inventon relates to an exposure indicator device which enables proper or improper exposure in a single lens reflex camera with a TTL exposure meter contained therein to be discriminating within and outside the finder of the camera.

2. Description of the Prior Art

In a single lens reflex camera with a TTL exposure meter contained therein, the light-sensing element of the exposure measuring circuit is inserted in the optical path of the finder and such light-sensing element may be affected by the light from the eyepiece to prevent appropriate measurement of the exposure from being achieved. For this reason, some cameras have an eyepiece shutter provided in the eyepiece portion to shut out the influence of the light.

Now, when such an eyepiece shutter is used, namely, closed, the interior of the finder can no longer be looked in and this eliminates the need for exposure indication to be effected within the finder but gives rise to the necessity of exposure indication being effected outside the finder. Heretofore, some other cameras have been provided with exposure meters both within and outside the finder to ensure exposure indication to take place both within and outside the finder.

SUMMARY OF THE INVENTION

The present invention intends to provide an exposure indicator device which effects exposure indication outside the finder during use (closing) of the eyepiece shutter and effects exposure indication within the finder during non-use (opening) of the eyepiece shutter.

According to the present invention, the exposure indicator device in a single lens reflex camera with a TTL exposure meter contained therein comprises shutter means extraneously operable for displacement between a position in which it closes a finder optical system at the eyepiece portion thereof to intercept light passed through the finder eyepiece portion into the interior of the finder and a position in which it is retracted from the first-named position, first indicator means for effecting exposure indication within the view field of the finder, and second indicator means for effecting exposure indication outside the view field of the finder. A feature of the present invention is that change-over means is operatively associated with the shutter means to cause only the first indicator means to effect the exposure indication when the shutter means is in said retracted position and to cause only the second indicator means to effect the exposure indication when the shutter means is in said light-intercepting position.

Other objects and features of the present invention will become fully apparent from the following detailed description taken in conjunction with the accompanying drawings.

DESCRIPTION OF THE PREFERRED EMBODIMENTS

Figure 1:
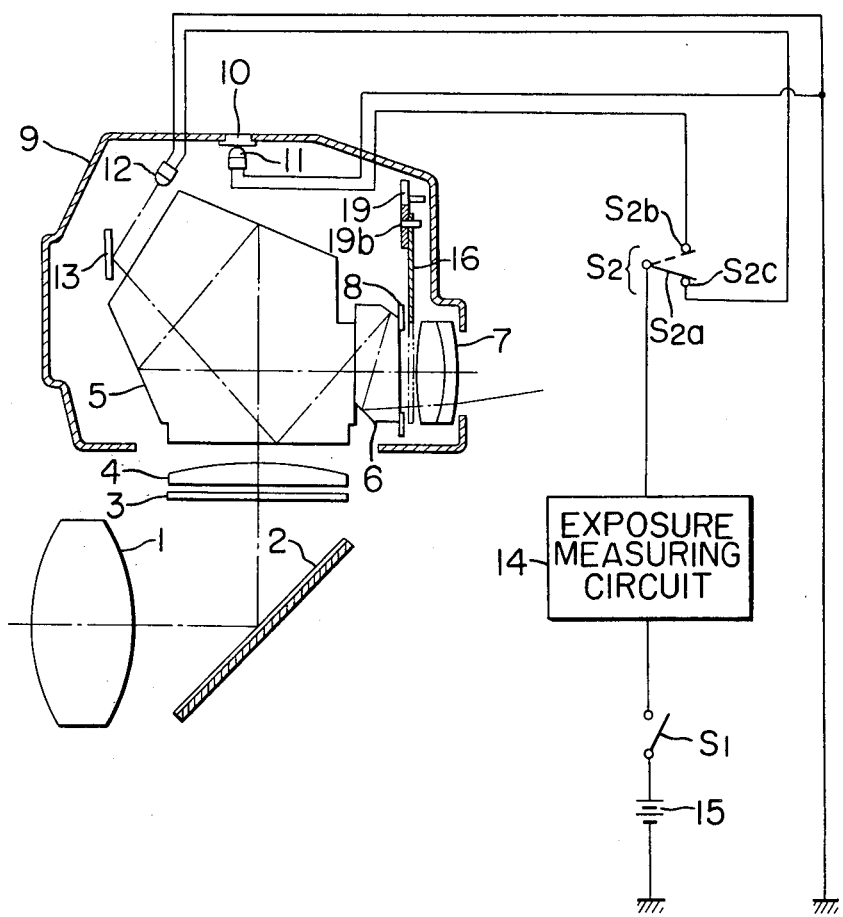
FIGS. 1 and 2 show an embodiment of the present invention, FIG. 1 being a vertical cross-sectional view of the pentaprism portion of a camera and also showing a diagram of electrical connection, and FIG. 2 being a perspective view of the eyepiece portion.
Figure 2:
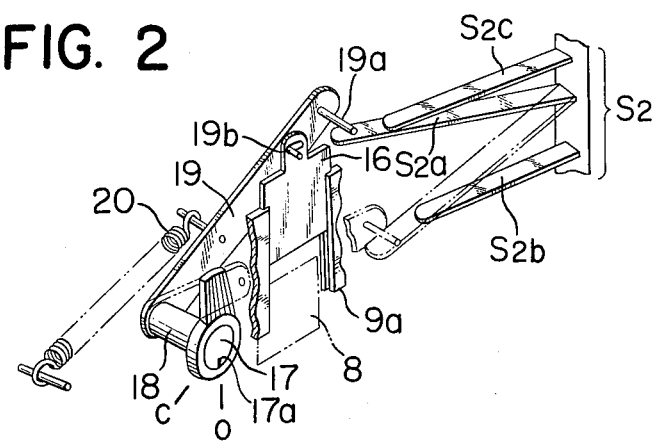

Referring to FIGS. 1 and 2, there is shown an embodiment of the present invention in which a light-emitting element is used as exposure indicator. In FIG. 1 which includes a vertical cross-section of the pentaprism portion, the image light passed through a picture-taking lens 1 and reflected at right angles by a mirror 2 passes to the outside through a finder optical system comprising a condenser lens 4, a pentaprism 5, a reflecting prism 6 for indication and an eyepiece 7.

An eyepiece mask 8 for restricting the finder view field is mounted on the reflecting prism 6.

In the upper portion of a pentaprism body cover 9, an indication window 10 for the outside-the-finder exposure meter is fitted and below the indication window, there is provided a first light-emitting element 11 which may comprise a light-emitting diode (LED) or the like. In the space between the body cover 9 and the pentaprism 5, there is provided a second light-emitting element 12 for the within-the-finder exposure meter so that the light from such element 12 is reflected by an exposure indication mirror 13 within the finder so as to pass into the pentaprism 5 and through the reflecting prism 6 and the eyepiece 7 to the outside.

A conventional exposure measuring circuit 14, which may compare the quantity of light to pass through the picture-taking lens 1 to the surface of a film with the amount of exposure determined by the exposure factor comprising a shutter speed, an aperture value provided by diaphragm blades, film sensitivity, etc. and which may be closed when a proper exposure is provided, is connected to a power source 15 through a main switch S1 and also connected selectively to the first 11 and the second light-emitting element 12 through a change-over switch S2 which is one element of change-over means. The change-over switch S2 has its movable contact S2a connected to the exposure measuring circuit while the first S2b and the second fixed contact S2c of the switch S2 are connected to the first 11 and the second light-emitting element 12, respectively, so that the movable contact S2a is selectively connected to the first S2b and the second fixed contact S2c in response to the opening-closing of an eyepiece shutter 16.

In FIG. 2 which is a perspective view of the eye-piece portion, the eyepiece shutter 16 is vertically slidable by a guide portion 9a forming a part of the main body. An eyepiece shutter change-over knob 17, which is extraneously operable to assume two positions, is securely mounted on a shaft 18 rotatably supported by the body cover (9 in FIG. 1) overlying the eyepiece (7 in FIG. 1). When the index mark 17a on the change-over knob 17 is set to "C" marked on the body cover 9, the eyepiece shutter 16 covers the opening of the eyepiece mask 8. An eyepiece shutter lever 19, which has a pin 19a engageable with the movable contact S2a of the change-over switch S2 and a pin 19b for pivotally supporting the eyepiece shutter 16, is securely mounted on the shaft 18 within the body cover (9 in FIG. 1) and is selectively biased in two directions by a toggle spring 20.

The elements 18–20 together constitute operating means for opening and closing the eyepiece shutter, as well as a part of the change-over means for the exposure indicator device according to the present invention. The slot in the eyepiece shutter 16 for receiving the pin 19b therein is formed as a laterally elongated one, and the movable contact S2a is biased upwardly.

FIGS. 1 and 2 show the position in which the index mark 17a on the change-over knob is set to "O" marked on the body cover 9. The eyepiece shutter 16 is retracted from the opening of the eyepiece mask 8 to its upper position.

The movable contact S2a of the change-over switch is biased upwardly, as viewed in FIG. 2, and into engagement with the second fixed contact S2c. The eyepiece shutter lever 19 is biased counter-clockwise by the toggle spring 20.

In the position, when the main switch S1 is closed, the exposure measuring circuit is operated and whenever a proper exposure is provided, the second light-emitting element 12 emits light. As already noted, this light may be confirmed via the mirror 13, the pentaprism 5, the reflecting prism 6 and the eyepiece 7.

Subsequently, to close the eyepiece shutter 16, the index 17a on the change-over knob is set from "O" to "C".

The eyepiece shutter lever 19 is first rotated against the counter-clockwise bias of the toggle spring 20 and, from a certain point, it is rotated by the bias of the toggle spring 20 which has changed to the clockwise bias.

When this occurs, the eyepiece shutter 16 is downwardly moved by the pin 19b while its lateral movement is prevented by the guide portion 9a, thus closing the opening of the eyepiece mask 8.

Also, the movable contact S2a of the change-over switch is disengaged fron the second fixed contact S2c by movement of the pin 9a and finally brought into engagement with the first contact S2b, as indicated by phantom line.

Thus, the connection of the exposure measuring circuit 14 is changed over from the second light-emitting element 12 to the first light-emitting element 11.

Therefore, if the main switch S1 is closed, the first light-emitting element 11 will emit light during proper exposure and such light may be confirmed through the indication window 10.

When the change-over knob 17 is set back to "O", the eyepiece shutter level 19 is rotated counter-clockwise to move the pins 19a and 19b upwardly, as viewed in FIG. 2, so that the eyepiece shutter 16 is retracted upwardly from the opening of the eyepiece mask 8 and the movable contact S2a of the change-over switch moves upwardly from its own biasing force to engage the second fixed contact S2c.

Thus, the position of FIGS. 1 and 2 is restored.

In the above-described embodiment, two light-emitting elements are employed but the rate of power consumption only corresponds to that by a single element.

The present embodiment employs one light-emitting element for each of the exposure indications within and outside the finder, but if a plurality of such elements are employed for the exposure indications within and outside the finder, respectively, it will also be possible to indicate underexposure and overexposure.

Further, in the above-described embodiment, the indicating location is changed over by changing over the indicator element with the aid of the switch in the electric circuit, where as it is also possible to mechanically change the indicating location.

Figure 3:
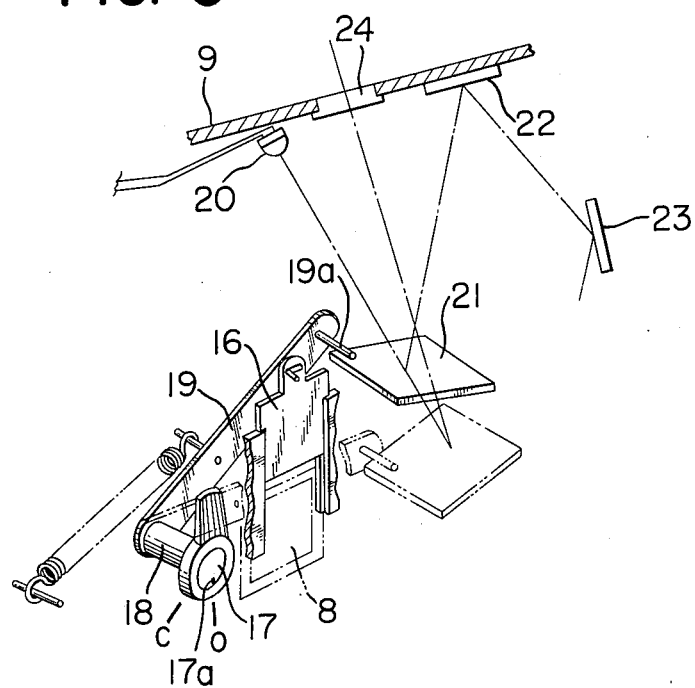
FIG. 3 is a perspective view of the eyepiece portion according to another embodiment of the present invention.

FIG. 3 shows another emobdiment of the present invention in which the indicating location is mechanically changed. A single exposure indicator element 20 such as light-emitting diode or ammeter is disposed inside the body cover 9. The exposure indicator element 20 is connected to the exposure measuring circuit so as to indicate a proper exposure when provided, in the same manner as described in connection with FIGS. 1 and 2. A movable mirror 21 is provided which may be actuated by a pin 19a of the eyepiece shutter lever 19 in such a manner that the mirror 21 is shifted up when the eyepiece shutter 16 is retracted from the opening of the mask 9.

When the index mask 17a on the change-over knob 17 is set to "O", the mirror 21 is upwardly moved to reflect the light from the exposure indicator element 20, whereafter the light is reflected by a mirror 22 secured to the body cover 9, so that the light may be confirmed via a mirror 23 and through the pentaprism 5, the reflecting prism 6 and the eyepiece 7.

When the change-over knob 17 is set to "C", the mirror 21 is downwardly moved as indicated by phantom lines, so that the light from the exposure indicator element 20 is reflected by the mirror 21 for confirmation through an indication window 24.

According to the present invention, as has hitherto been described, when the eyepiece shutter is in open position, the exposure condition may be known by looking through the finder and when the eyepiece shutter is in closed condition, the invisible exposure indication within the finder is discontinued and instead, the exposure condition may be known outside the finder.

We claim:

1. An exposure indicator device in a single lens reflex camera with a TTL exposure meter contained therein, comprising:
   shutter means extraneously operable for displacement between a position in which it closes a finder optical system at the eyepiece portion thereof to intercept light passed through the finder eyepiece portion into the interior of the finder and a position in which it is retracted from said first-named position;
   first indicator means for effecting exposure indication within the view field of the finder; and
   second indicator means for effecting exposure indication outside the view field of the finder;
   the improvement comprising:
   change-over means operatively associated with said shutter means to cause only said first indicator means to effect the exposure indication when said shutter means is in said retracted position and to cause only said second indicator means to effect the exposure indication when said shutter means is in said light-intercepting position.

2. An exposure indicator device according to claim 1, wherein said first indicator means includes a first indicator element for effecting exposure indication within the finder view field, and said second indicator means includes a second indicator element for effecting exposure indication outside the finder view field.

3. An exposure indicator device according to claim 2, wherein said change-over means includes switch means for selectively flowing a current to one of said first and second indicator elements.

4. An exposure indicator device according to claim 3, wherein said first indicator means further includes means for directing light from said first indicator element to the finder, and said second indicator means further includes means for directing light from said second indicator element to a position in which the light may be observed from an exterior portion of the camera body which is outside the finder.

5. An exposure indicator device according to claim 1, wherein said first and second indicator means include:

an indicator element;

guide means for directing light from said indicator element into the finder view field upon emergence of the light; and guide means for directing light from said indicator element to a position in which the light may be observed from an exterior portion of the camera body which is outside the finder view field, upon emergence of the light.

6. An exposure indicator device according to claim 5, wherein said change-over means includes a movable reflecting member disposed between said indicator element and said two guide means for causing the light from said indicator element to be directed toward one of said two guide means.

* * * * *